(12) United States Patent
Hermans et al.

(10) Patent No.: US 9,644,748 B2
(45) Date of Patent: May 9, 2017

(54) SEAL FOR A SAWING MACHINE FOR SEPARATING ELECTRONIC COMPONENTS AND SAWING MACHINE PROVIDED WITH SUCH A SEAL

(75) Inventors: Mark Hermans, Geldermalsen (NL); Lambertus Franciscus Wilhelmus Van Haren, Druten (NL); Gerardus Hermanus Johannes Reulink, Kilder (NL)

(73) Assignee: Besi Netherlands B.V., Duiven (NL)

( * ) Notice: Subject to any disclaimer, the term of this patent is extended or adjusted under 35 U.S.C. 154(b) by 397 days.

(21) Appl. No.: 13/977,187

(22) PCT Filed: Dec. 21, 2011

(86) PCT No.: PCT/NL2011/050871
§ 371 (c)(1),
(2), (4) Date: Sep. 10, 2013

(87) PCT Pub. No.: WO2012/091559
PCT Pub. Date: Jul. 5, 2012

(65) Prior Publication Data
US 2013/0340585 A1    Dec. 26, 2013

(30) Foreign Application Priority Data
Dec. 30, 2010 (NL) ...................................... 2005941

(51) Int. Cl.
*F16J 15/46*    (2006.01)
*B23D 59/00*   (2006.01)
*B28D 1/04*    (2006.01)
*B28D 7/04*    (2006.01)

(52) U.S. Cl.
CPC .............. *F16J 15/46* (2013.01); *B23D 59/00* (2013.01); *B28D 1/047* (2013.01); *B28D 7/043* (2013.01); *Y10T 83/22* (2015.04)

(58) Field of Classification Search
CPC .. F16J 15/00; F16J 15/02; F16J 15/021; F16J 15/022; F16J 15/027; F16J 15/46; F16J 15/50; F16J 15/52; F16J 15/48
See application file for complete search history.

(56) References Cited

U.S. PATENT DOCUMENTS 1,841,868 A * 1/1932 Wuebling ........................ 49/366
2,720,011 A * 10/1955 Krupp ........................... 49/477.1
3,178,779 A * 4/1965 Clark et al. ................... 277/646
3,428,272 A   2/1969 Feder
(Continued)

FOREIGN PATENT DOCUMENTS

DE    4241578 C1    3/1994
EP    1160041 A2    12/2001
(Continued)

*Primary Examiner* — Stephen Choi
(74) *Attorney, Agent, or Firm* — The Webb Law Firm

(57) ABSTRACT

The invention relates to a seal for a sawing machine (1) for separating electronic components (12), comprising: an elongate form-retaining holder (20,22), a flexible, elongate expandable body (8,9)and a pressure source (24) for a medium, wherein the elongate expandable body (8,9) is provided with a strengthened elongate edge (21) which lies clear of the form-retaining holder (20,22) The invention also relates to a sawing machine (1) for separating electronic components (12) provided with such a seal.

12 Claims, 4 Drawing Sheets

(56) References Cited

U.S. PATENT DOCUMENTS

| | | | | |
|---|---|---|---|---|
| 3,879,902 A | * | 4/1975 | Haberlin | 451/38 |
| 4,335,765 A | * | 6/1982 | Murphy | B23D 47/025 |
| | | | | 108/92 |
| 4,376,543 A | * | 3/1983 | Sakagami | 277/345 |
| 4,579,192 A | * | 4/1986 | Mueller | 277/312 |
| 5,076,108 A | * | 12/1991 | Trimarchi | 73/866.5 |
| 5,201,804 A | | 4/1993 | Hisajima | |
| 6,832,680 B1 | | 12/2004 | Matsumura | |
| 2002/0060814 A1 | | 5/2002 | Angelbeck et al. | |
| 2006/0056955 A1 | * | 3/2006 | Kim et al. | 414/806 |

FOREIGN PATENT DOCUMENTS

| | | | |
|---|---|---|---|
| EP | 1208971 A1 | 5/2002 | |
| WO | 9507423 A1 | 3/1995 | |

\* cited by examiner

SEAL FOR A SAWING MACHINE FOR SEPARATING ELECTRONIC COMPONENTS AND SAWING MACHINE PROVIDED WITH SUCH A SEAL

CROSS REFERENCE TO RELATED APPLICATION

This application claims the benefit of International Patent Application No. PCT/NL2011/050871 entitled "Seal for a Sawing Machine for Separating Electronic Components and Sawing Machine Provided with Such a Seal", which claims priority to Netherlands Application No. 2005941, filed Dec. 30, 2010, which are hereby incorporated by reference in their entirety.

BACKGROUND OF THE INVENTION

Field of the Invention

The invention relates to a seal for a sawing machine for separating electronic components and to a sawing machine for separating electronic components, comprising: at least one rotatable saw-blade placed in a housing and a product holder displaceable over the upper part of the saw-blade, wherein the housing is provided on the upper side with a slot-like opening for admitting at least the part of the product holder holding the electronic components into the housing in displaceable manner.

Description of Prior Art

Sawing/separating of the electronic components is a process wherein use is generally made of cooling liquid and wherein fragments such as sawdust are released. This results in a process which causes contamination which is undesirable some distance from the sawing process. The saw-blade which rotates (at high speed) and the product holder can therefore be enclosed with a protective housing. A problem here is that it must be possible to move the product holder relative to the saw-blade; it must after all be possible to move the held electronic components along the upper part of the rotating saw-blade such that saw cuts are formed at precisely determined positions. The housings applied according to the prior art are open on the upper side to allow passage of the product holder. In practice however, this still causes contamination of the surrounding area by cooling liquid and sawing waste.

The object of the present invention is to provide an improved sawing machine and a seal with which the contamination occurring heretofore during separation of electronic components can be reduced or even prevented.

SUMMARY OF THE INVENTION

The invention provides for this purpose a seal for a sawing machine for separating electronic components, comprising: an elongate form-retaining holder, a flexible, elongate expandable body connected to the form-retaining holder and sealing a space medium-tightly, a pressure source for a medium connecting to the space sealed by the flexible expandable body, wherein the elongate expandable body is provided with a strengthened elongate edge which lies clear of the form-retaining holder. The flexible, elongate expandable body can be inflated such that the strengthened elongate edge is urged a relatively great distance from the form-retaining holder. An entry to the space in which the separating process takes place can thus be better shielded from the surrounding area. The strengthened elongate edge can here be urged against another part of a protective housing, although it is also possible for a displaceable holder to be moved along the strengthened elongate edge. The strengthened edge provides here for a robust construction; the expandable body is after all less likely to be damaged if it is engaged on the strengthened elongate edge than if it is engaged on a more flexible part of the expandable body.

The seal preferably takes a dual form such that it comprises two opposite flexible, elongate expandable bodies which are supported by two elongate, form-retaining holders which are placed at a mutual distance such that the strengthened elongate edges of the flexible, elongate expandable bodies connect to each other in an expanded state. By applying two opposite flexible, elongate expandable bodies which connect to each other a relatively wide slot can also be sealed and an improved seal is created. The reason for the improved sealing is that, when an object is moved through a slot having an elongate expandable body on either side thereof, it will also be possible for a flexible connection of the expandable body to the object to occur on two sides, resulting in a better sealing than if a slot is provided on only one side with an elongate expandable body.

It is found in practice to be no problem to manufacture longer seals with a length of for instance 0.8 meter or more in this way. In a practical embodiment the elongate, form-retaining holder is embodied as a profile part, for instance an extruded profile.

For a good contact of specifically the strengthened elongate edge with the surrounding area, the edge desirably protrudes from the elongate expandable body. The cross-section through the strengthened elongate edge perpendicularly of the longitudinal on the side directed toward the flexible part of the elongate expandable body can advantageously be provided with a substantially rounded form. When the strengthened elongate edge is pressed (locally) inward, the flexible part will thus be easily able to lie closely against the strengthened elongate edge, wherein the flexible part of the expandable body being forced outward (with an increased chance of damage) when the strengthened edge is pressed inward is countered. Another advantage of the rounded construction is that the seal can be compressed over a relatively great distance and with relatively limited resistance. It is found possible in practice to achieve good results (compressibility, durability, robustness, resistance) if the elongate expandable body is manufactured from an elastomer such as TSE (thermoset elastomer) or a (natural) rubber, for instance with a hardness >60 Shore. Other flexible materials can however also be applied for this purpose.

In order to allow an object to make contact in simple manner with the flexible, elongate expandable body with strengthened elongate edge, it is advantageous for the body to be provided on at least one of the end surfaces with a chamfered contact surface.

It can also be advantageous to provide the pressure source for a medium with an intelligent control with which the pressure (liquid pressure or gas pressure) can be regulated, optionally subject to determined ambient and process conditions. If a pressure gauge or flow meter also connects to the space sealed by the flexible expandable body, leakage from the seal can thus also be detected or other conditions of use detected (pressure check or flow measurement), as a result of which the intelligent control can then optionally intervene. Possible leakage of the seal can be monitored in a continuous or intermittent manner by means of checking the pressure or the flow of the medium in/to the elongate expandable body or at the pressure source.

The present invention also provides a sawing machine, slot-like opening of which can be closed by a seal as described above. In an advantageous embodiment variant the displaceable product holder is carried here on the upper side by a rotatable shaft, which shaft is provided at the position of the seal with at least one guide roller connecting to the seal. With such a sawing device the advantages can be realized as already described above with reference to the seal according to the present invention; these advantages in relation to the sawing device are also included here by way of reference. The seal makes it possible to prevent significant quantities of cooling liquid present during the sawing process exiting the sawing device and contaminating the surrounding area. Fragments, gases and dust released during the sawing can also be collected in controlled manner by means of the present invention. This results in a reduced contamination of the surrounding area, with all the associated advantages for process control of other operations and/or processes taking place in the same production space, but also in improved working conditions for process operators.

The immediate safety interests of the operators are also served by the present invention; the present sawing machine will after all be able to contain the remainders of a shattered saw-blade.

In a more specific embodiment the rotatable shaft is provided with at least two guide rollers connecting to opposite seals. These guide rollers limit the resistance with which the rotatable shaft can be moved along the seals, with all the resulting advantages, such as for instance more accurate positioning and decreased energy consumption. The seal can be mounted on a fold-away housing plate so that the entry to the housing with the saw-blade (or saw-blades, since sawing machines with more than one saw-blade also form part of the present invention) can be easily enlarged. In structural terms the connection of the pressure source to the flexible, elongate expandable body must of course be taken into account here; this connection must be embodied (for instance by means of a deformable connecting conduit) such that the necessary freedom of movement is imparted to the flexible, elongate expandable body.

For still further improvement in the sealing of the space with the saw-blade, it is possible for the product holder to be provided on the side thereof admitted into the housing with a splash plate extending substantially parallel to the seal. Smaller openings between the elongate expandable body and the displaceable product holder (particularly where the two come together) are also shielded even better with such a splash plate.

The present invention will be further elucidated on the basis of the non-limitative exemplary embodiments shown in the following figures. Herein:

Figure 1:
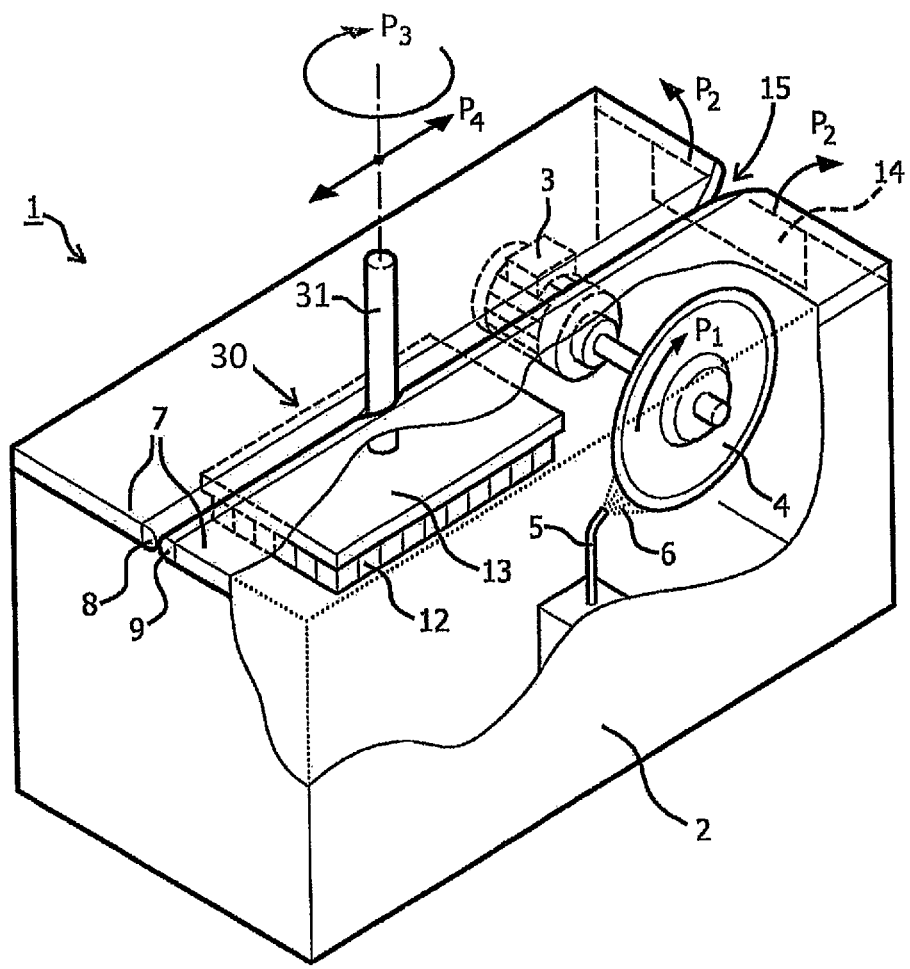
FIG. 1 is a schematic perspective view of a sawing device according to the present invention.

FIG. 1 is a schematic view of a sawing machine 1 with a housing or space 2 shown cut-away in which is disposed a saw-blade 4 rotatable as according to arrow $P_1$ by means of a drive 3. Situated close to saw-blade 4 is a nozzle 5 with which a liquid 6 is applied to saw-blade 4. Space 2 is sealed on the upper side by two covers 7 which can be pivoted away as according to arrows $P_2$. Present between the two covers 7 is a gap sealable by means of two flexible, elongate expandable bodies 8, 9 directed toward each other. The elongate expandable bodies 8, 9 are further elucidated with reference to FIG. 2. A shaft 10 is displaceable between the two elongate expandable bodies 8, 9, this shaft 10 forming part of a product holder 11 with which electronic components 12 to be sawn can be held by means of a gripper plate 13 to which an underpressure is usually applied. Product holder 11 is displaceable at least rotatably (arrow $P_3$) and in linear direction (arrow $P_4$) such that the required saw-cuts can be made for the purpose of separating electronic components 12. Further shown in this figure is that space 2 is provided on one side with an entry 14 for passage of product holder 11 with electronic components 12 such that product holder 11 can set down separated electronic components 12 outside space 2 and can pick up electronic components 12 yet to be separated. The two elongate expandable bodies 8, 9 are provided at the position of entry 14 with a positioning opening 15 so that shaft 10 can be carried easily between the two elongate expandable bodies 8, 9.

Figure 2:
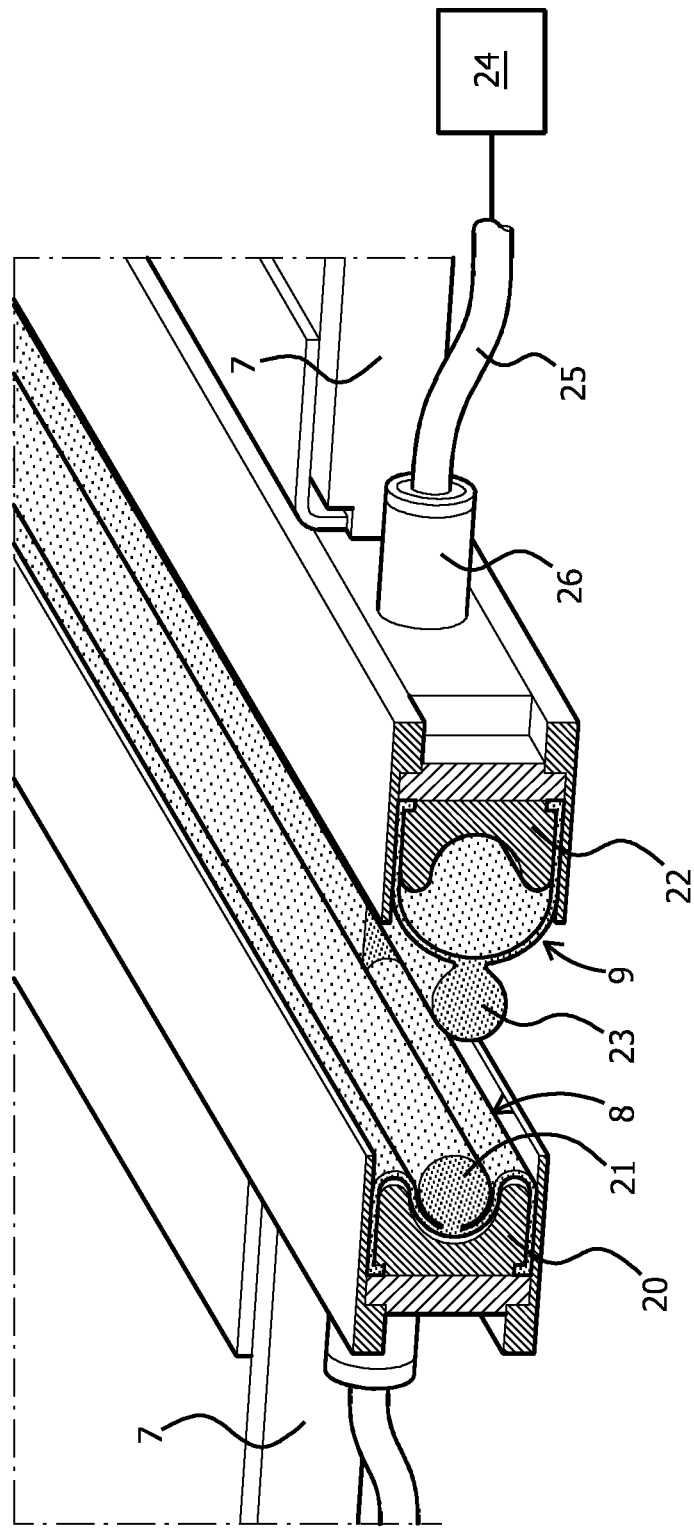
FIG. 2 is a perspective view of a cross-section through the seal according to the present invention.

FIG. 2 shows a cross-section of the two elongate expandable bodies 8, 9 which are each arranged individually on one of the two covers 7. The elongate expandable body 8 is mounted on an elongate, form-retaining holder 20 and is provided with a strengthened elongate edge 21, in this case of circular cross-section, which lies free of form-retaining holder 20. The elongate form-retaining holder 20 is formed such that the strengthened elongate edge 21 can be pushed inward over some distance without the elongate expandable body 8 herein protruding or running a greater risk of being damaged. Unnecessary damage to elongate expandable body 8 is also prevented because the strengthened elongate edge 21 is rounded on the side facing toward elongate expandable body 8. Elongate expandable body 9 is mounted on an elongate form-retaining holder 22 and is likewise provided with a strengthened elongate edge 23. Elongate expandable body 9 is in an inflated, protruding state. For the purpose of elucidation the elongate expandable bodies 8, 9 are shown in this figure in the two most extreme states, i.e. the fully pressed inward and fully extended states. For the purpose of developing a medium pressure in elongate expandable body 9 pressure is applied in elongate expandable body 9 by means of a schematically shown pressure source 24 through a conduit 25 and via connection 26.

Figure 3:
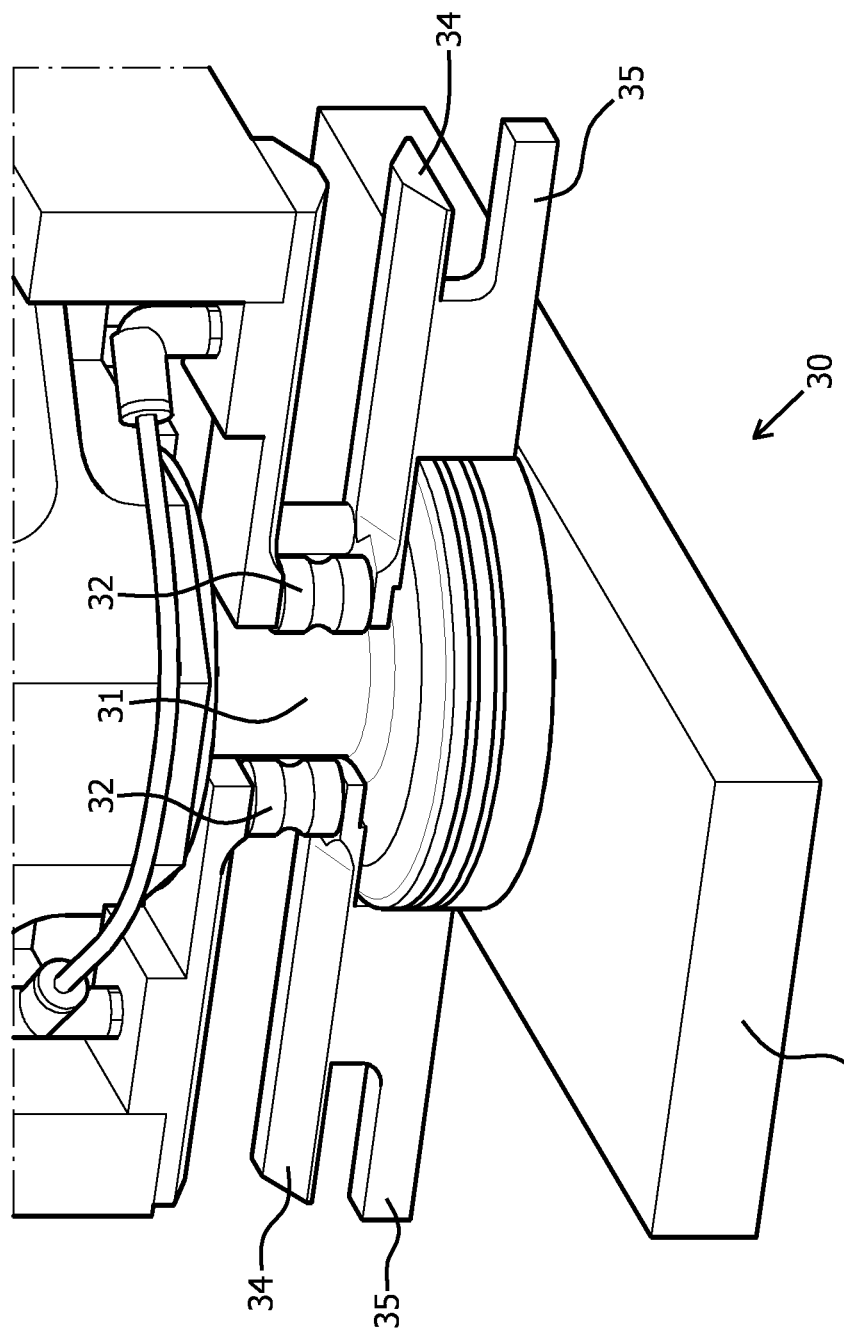
FIG. 3 is a perspective view of a displaceable product holder of a sawing device according to the present invention.

FIG. 3 shows a displaceable product holder 30 of a sawing device as shown schematically in FIG. 1. A pair of roller elements 32 are arranged parallel to a shaft 31 of product holder 30 such that they will engage on the strengthened elongate edges 21, 23 of the seal as described for instance with reference to FIG. 2. Roller elements 32 decrease the frictional resistance with which product holder 30 can be displaced relative to seals 8, 9 and facilitate positioning of the displaceable product holder 30 relative to the strengthened elongate edges 21, 23. Product holder 30 is further provided with a gripper plate 33 for holding electronic components (not shown here). A shielding plate 34, also referred to as a splash plate, is moreover situated between roller elements 32 and gripper plate 33. This shielding plate 34 is present to shield small openings between product holder 30 and the strengthened elongate edges 21, 23 of seals 8, 9 where they come together (see FIG. 4 herefor). Drying strips 35, with which the electronic components and gripper plate 33 can be blown dry, are further also arranged under shielding plate 34. The product holder is assembled such that roller elements 32, shielding plate 34 and drying strips 35 do not co-rotate when gripper plate 33 rotates.

Figure 4:
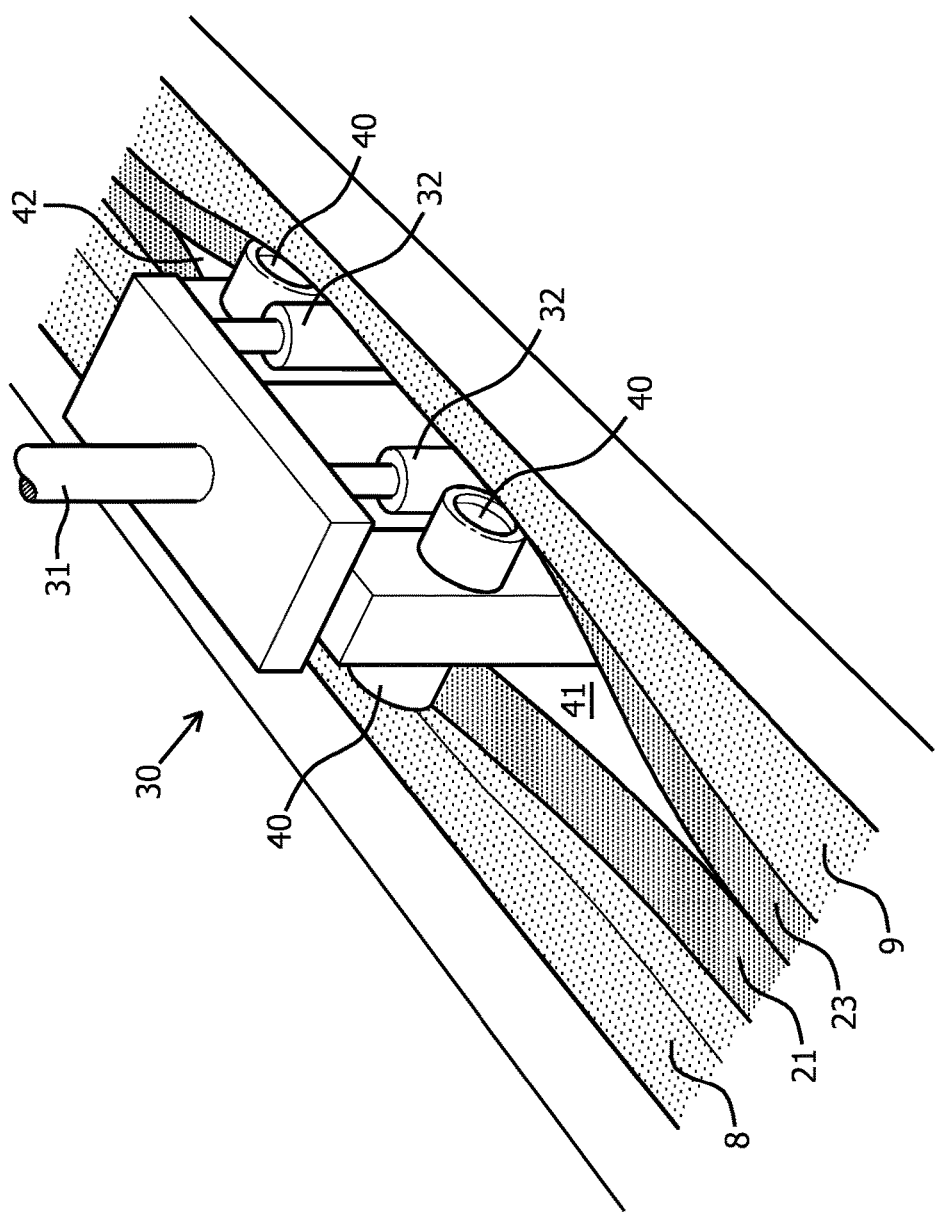
FIG. 4 is a perspective detail view of the co-action of a seal according to the present invention with a displaceable product holder of a sawing device.

Finally, FIG. 4 shows a view of the co-action of a seal as shown in FIG. 2 with the displaceable product holder 30 of FIG. 3. In addition to the roller elements 32 disposed vertically parallel to shaft 31 of product holder 30, horizontally placed roller elements 40 can here also be seen which likewise engage on the strengthened elongate edges 21, 23. The limited openings 41, 42 between the strengthened elongate edges 21, 23 close to displaceable product holder 30 are clearly shown. The strengthened elongate edges 21, 23 are urged apart by product holder 30 and are limited in their flexibility such that some distance is required before the pressure in elongate extendable bodies 8, 9 urges elongate edges 21, 23 back together again. Shielding plate 34 of FIG. 3 is arranged to limit passage of contamination through these openings 41, 42.

The invention claimed is:

1. A sawing machine for separating electronic components, comprising:
   at least one rotatable saw-blade placed in a housing, and
   a product holder displaceable over an upper part of the saw-blade,
   wherein the housing is provided on an upper side with a slot for admitting at least the part of the product holder holding the electronic components into the housing in displaceable manner, wherein the slot is closable by a seal, and
   further wherein the displaceable product holder is carried on an upper side by a rotatable shaft, wherein said rotatable shaft is provided at the position of the seal, and
   wherein the seal takes a dual form such that the seal comprises two opposite flexible, elongate expandable bodies which are supported by two elongate, form-retaining holders which are placed at a mutual distance such that strengthened elongate edges of the flexible, elongate expandable bodies connect to each other in an expanded state and wherein the product holder is provided with at least two guide elements for limiting the resistance with which the rotatable shaft can be moved along the seal, each of the guide elements abutting against one of the opposite elongate edges.

2. The sawing machine as claimed in claim 1, wherein the seal is carried by a fold-away housing plate.

3. The sawing machine as claimed in claim 1, wherein the product holder is provided with a splash plate extending substantially parallel to the seal, said splash plate is provided on the side of the product holder admitted into the housing.

4. A sawing machine for separating electronic components, comprising:
   at least one rotatable saw-blade placed in a housing, and
   a product holder displaceable over an upper part of the saw-blade,
   wherein the housing is provided on an upper side with a slot for admitting at least the part of the product holder holding the electronic components into the housing in displaceable manner, wherein the slot is closable by a seal, the seal comprising:
   an elongate form-retaining holder,
   a flexible, elongate expandable body connected to the form-retaining holder and sealing a space medium-tightly,
   a pressure source fluidly coupled to the elongate expandable body, and
   wherein the elongate expandable body is provided with a strengthened elongate edge which is spaced from the form-retaining holder,
   wherein the seal takes a dual form such that the seal comprises two opposite flexible, elongate expandable bodies which are supported by two elongate, form-retaining holders which are placed at a mutual distance such that the strengthened elongate edges of the flexible, elongate expandable bodies connect to each other in an expanded state, and
   wherein the product holder is provided with at least two guide elements for limiting the resistance with which a rotatable shaft can be moved along the seal, each of the guide elements abutting against one of the opposite elongate edges.

5. The sawing machine of claim 4, wherein the elongate, form-retaining holder is a profile part.

6. The sawing machine of claim 4, wherein the strengthened elongate edge protrudes from the elongate expandable body.

7. The sawing machine of claim 6, wherein the strengthened elongate edge has a substantially rounded cross-section.

8. The sawing machine of claim 4, wherein the elongate expandable body is manufactured from an elastomer.

9. The sawing machine of claim 4, wherein the elongate expandable body is manufactured from TSE or a rubber.

10. The sawing machine of claim 4, wherein at least one of the faces of the flexible, elongate expandable body with the strengthened elongate edge is provided with a chamfered contact surface.

11. The sawing machine of claim 4, wherein the seal is carried by a foldaway housing plate.

12. The sawing machine of claim 4, wherein the product holder is provided with a splash plate extending substantially parallel to the seal, said splash plate is provided on the side of the product holder admitted into the housing.

\* \* \* \* \*